May 31, 1949.　　　　G. E. DATH　　　　2,471,481
FRICTION SHOCK ABSORBING MECHANISM
Filed May 30, 1945
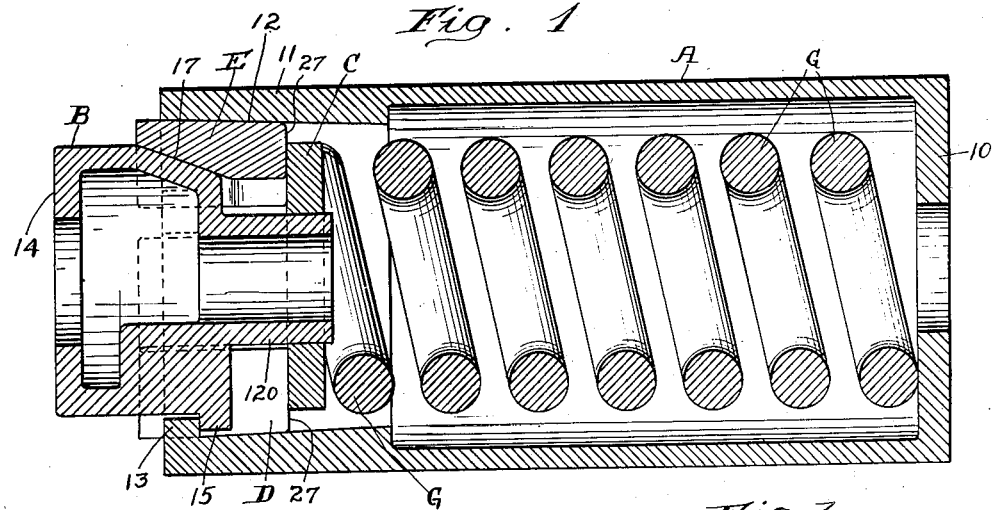
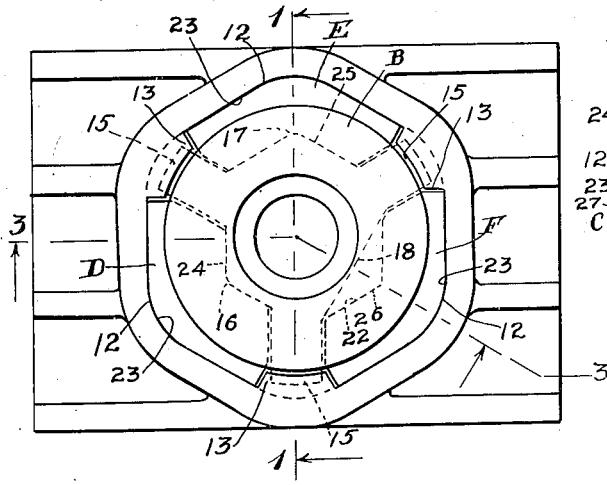
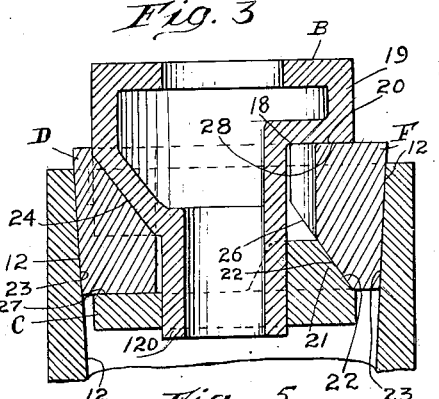
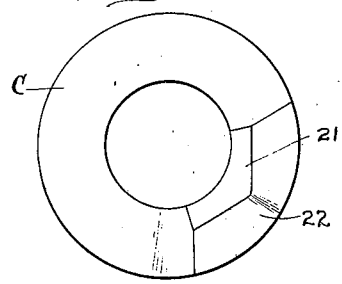
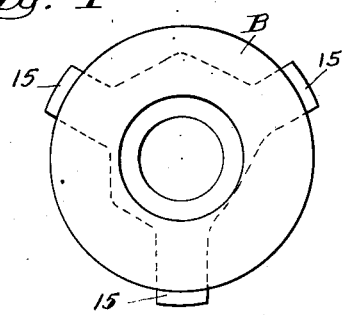
Inventor:
George E. Dath
By Henry Fuchs.
Atty.

Patented May 31, 1949

2,471,481

UNITED STATES PATENT OFFICE 2,471,481

FRICTION SHOCK ABSORBING MECHANISM

George E. Dath, Mokena, Ill., assignor to W. H. Miner, Inc., Chicago, Ill., a corporation of Delaware Application May 30, 1945, Serial No. 596,782

9 Claims. (Cl. 267—9)

This invention relates to improvements in friction shock absorbing mechanisms.

One object of the invention is to provide a high capacity friction shock absorbing mechanism comprising a friction column having a plurality of lengthwise extending friction surfaces, a friction clutch slidingly engaging the friction column and having sliding frictional engagement with the friction surfaces thereof, and spring means yieldingly opposing inward movement of the clutch with respect to said column, wherein the friction clutch includes a pressure transmitting member adapted to receive the actuating force, a spring follower member having its inward movement opposed by said spring means, a friction shoe having wedging engagement with said spring follower member only, and additional friction shoes having wedging engagement with said wedge member only, all of said shoes receiving the actuating pressure from said pressure transmitting member and having their movement inwardly of the column opposed by said spring resisted follower member, and each of said shoes having sliding frictional engagement with one of the friction surfaces of the column.

A more specific object of the invention is to provide a mechanism as specified in the preceding paragraph, wherein some of the engaging wedge faces of the shoes and the corresponding members are disposed at relatively keen wedging angles to produce high frictional capacity of the clutch, and the remaining wedge faces of the same are disposed at relatively blunt releasing angles to provide for easy release of the clutch.

Other objects of the invention will more clearly appear from the description and claims hereinafter following.

In the drawing forming a part of this specification, Figure 1 is a longitudinal, vertical sectional view of my improved friction shock absorbing mechanism, said view corresponding substantially to the line 1—1 of Figure 2. Figure 2 is a front elevational view of Figure 1. Figure 3 is a longitudinal sectional view of the front end portion of the mechanism taken on two intersecting planes at approximately 150 degrees to each other and corresponding substantially to the angular line 3—3 of Figure 2. Figure 4 is a front elevational view of the pressure transmitting member of my improved mechanism. Figure 5 is a front elevational view of the spring follower member of my improved mechanism.

My improved shock absorbing mechanism as shown in the drawings comprises broadly a friction casing A; a pressure transmitting member B; a spring follower member C; three friction shoes D, E, and F, the shoes D and E having wedging engagement with the pressure transmitting member B and the shoe F having wedging engagement with the spring follower member C; and a spring resistance G.

The casing A is in the form of a tubular member of hexagonal, transverse cross section, open at the front end and closed at the rear end by a transverse, vertical wall 10. At the forward or open end, the walls of the casing A are thickened, thereby providing the friction shell section proper 11 of the casing. The friction shell section 11 presents three interior, inwardly converging friction surfaces 12—12—12 of V-shaped, transverse cross section, each of said surfaces 12 being formed by two adjacent walls of the hexagonal shell section 11. At the forward end, the casing A is provided with three laterally inturned stop lugs 13—13—13, which are located at the corners of the casing between adjacent friction surfaces.

The pressure transmitting member B is in the form of a hollow block having a flat, transverse front end face 14 adapted to bear on the usual front follower of a railway draft rigging. At the forward end portion, the block or member B is of cylindrical shape and inwardly of said cylindrical end presents, in effect, three sides disposed symmetrically about the central, longitudinal axis of the mechanism. Spaced inwardly from the front end thereof, the block or member B has three radially projecting retaining lugs 15—15—15, which are spaced 120 degrees apart and are adapted to engage in back of the lugs 13—13—13 of the casing to limit outward movement of the member or block B. At the three sided inner end portion thereof, the member B has two inwardly converging wedge faces 16 and 17 of V-shaped transverse cross section, which faces are at two adjacent sides of said member. At the third side thereof, the member or block B is cut out or recessed, as indicated at 18, thereby providing, in effect, a lateral projection 19 presenting a transverse wall or abutment face 20. The wedge faces 16 and 17 and the projection 19 are alternated with respect to the lugs 15—15—15, that is, one of the lugs 15 is disposed between the adjacent wedge faces 16 and 17 and the remaining two lugs 15—15 are disposed between the projection 19 and said wedge faces 16 and 17. Considered lengthwise of the mechanism, the wedge face 17 is disposed at a relatively keen wedging angle while the wedge face 16 is disposed at a relatively blunt releasing angle, the wedge faces 16 and 17 are thus relatively keen and blunt.

At the rear end, the pressure transmitting member or block B has a rearwardly extending, cylindrical stem 120 of hollow tubular form.

The spring follower C is in the form of a flat ring having a forwardly projecting enlargement or wedge projection 21 thereon at one side of the same, said wedge projection 21 being provided with a V-shaped wedge face 22 on the outer side thereof, which face is inclined toward the central axis of the mechanism in forward direction. The angularity of the wedge face 22 is preferably such as to provide a keen wedging action, similar to the wedge face 17 of the pressure transmitting member. The ringlike spring follower is telescoped or engaged over the stem 120 of the pressure transmitting member B and the opening of said ring is of such a size as to slidingly fit said stem.

The friction shoes D, E, and F are of similar design except as hereinafter pointed out. Each of the shoes has a longitudinally extending, outer friction surface 23 of V-shaped, transverse cross section slidingly engaged with the corresponding V-shaped friction surface 12 of the casing. On the inner side thereof, each shoe has a V-shaped wedge face, the wedge faces of the shoes D, E, and F being indicated respectively by 24, 25, and 26. The wedge faces 24 and 25 are at the front ends of the shoes D and E and the wedge face 26 of the shoe F is at the rear end thereof. The wedge faces 24 and 25 of the shoes D and E engage respectively with and are correspondingly inclined to the wedge faces 16 and 17 of the pressure transmitting member B, and the wedge face 26 of the shoe F is correspondingly inclined to and engages with the wedge face 22 of the spring follower member C. In other words, the shoes D and E have, respectively, blunt and keen wedging engagement with the pressure transmitting member B and the shoe F has keen wedging engagement with the spring follower C. The shoes D and E have flat, transverse, rear end faces 27—27 bearing on the spring follower C and the shoe F has a flat, transverse, front end face 28 bearing on the abutment face 20 of the member B.

The spring resistance G comprises a single helical coil having its front and rear ends bearing respectively on the spring follower C and the rear end wall 10 of the casing A. The spring C is preferably under slight initial compression in the full release position of the mechanism illustrated in Figure 1.

In assembling my improved shock absorbing mechanism, the spring G, spring follower C, and the friction shoes D, E, and F are placed within the casing A and the shoes forced inwardly of the casing against the resistance of the spring G until the front ends of the shoes reach a position inwardly of the lugs 13 to provide sufficient clearance to permit the lugs 15 of the pressure transmitting member B to be engaged in back of the lugs 13 when the member B is given a partial turn. With the shoes held in this inward position by any suitable tool, the pressure transmitting member B is placed within the open front end of the casing, the same having first been given a partial turn so that the lugs 15 thereof will pass through the open spaces between the lugs 13 of the casing. After the pressure transmitting member has been pushed into the casing to such an extent that the lugs 15 thereof are disposed inwardly beyond the lugs 13 of the casing, the pressure transmitting member is given a partial turn to register the lugs 15 with the lugs 13, so that they will engage the latter and limit outward movement of the pressure transmitting member. After this has been done, the tool is withdrawn from its holding position, permitting the spring G to force the spring follower C and the shoes D, E, and F against the pressure transmitting member B with the wedge face of the shoes D and E engaging the wedge faces of the pressure transmitting member and the flat front end of the shoe F engaging the abutment face 20.

The operation of my improved friction shock absorbing mechanism is as follows: Assuming a compression action applied to the mechanism, as the pressure transmitting member B is forced inwardly of the casing, blunt wedging action is produced between the wedge faces of said member and the shoe D while keen wedging action is produced between the wedge faces of the member B and the shoe E and between the wedge faces of the shoe F and the spring follower C, thereby forcing the three shoes into tight frictional contact with the friction surfaces of the casing and carrying the same inwardly of the mechanism against the resistance of the spring G. During this action, the shoe F moves in unison with the pressure transmitting member B, due to engagement of the flat, transverse abutment faces thereof with each other.

Upon removal of the actuating force, releasing action is induced by reason of the blunt wedging engagement between the pressure transmitting member B and the shoe D and the parts are all restored to the normal full release position shown in Figure 1, outward movement of the pressure transmitting member being limited by shouldered engagement of the lugs thereof with the lugs of the casing A.

I claim:

1. In a friction shock absorbing mechanism, the combination with a friction casing; of a friction clutch slidingly telescoped within said casing, said clutch including a plurality of friction shoes having sliding frictional engagement with the interior of said casing, and a pressure transmitting member adapted to receive the actuating force and engaging the forward end portions of said shoes; a spring follower engaging the rear end portions of said shoes, one of said shoes having wedging engagement with said spring follower only, and the remaining shoes having wedging engagement with said pressure transmitting member only; and spring resistance means yieldingly opposing movement of said spring follower inwardly of the casing.

2. In a friction shock absorbing mechanism, the combination with a friction casing having interior friction surfaces; of a friction clutch slidingly telescoped within the casing, said clutch including an outer pressure transmitting member, an inner spring follower, a shoe movable inwardly in unison with said pressure transmitting member and having wedging engagement only with said spring follower, and additional shoes having wedging engagement with said pressure transmitting member only and bearing on said spring follower, all of said shoes having sliding frictional engagement with the friction surfaces of the casing; and a spring resistance yieldingly opposing movement of said spring follower inwardly of the casing.

3. In a friction shock absorbing mechanism, the combination with a friction casing having interior friction surfaces; of a plurality of friction shoes within the casing having sliding frictional engagement with the friction surfaces thereof; an inner spring follower; an outer pressure transmitting member adapted to receive the actuating force, said member having a flat, transverse abutment face engaging the outer end of one of said shoes to force the same inwardly of the casing, said shoe having wedging engagement with the spring follower, said pressure transmitting member having wedging engagement with the remaining shoes, said remaining shoes bearing on said spring follower, the engagement of said last named shoes and spring follower being on flat transverse faces; and spring resistance means within the casing yieldingly opposing inward movement of the spring follower.

4. In a friction shock absorbing mechanism, the combination with a friction column element; of a friction clutch having lengthwise sliding engagement with said column element, said clutch including a plurality of friction shoes, and a pressure transmitting member adapted to receive the actuating force and engaging the forward end portions of said shoes, all of said shoes having sliding frictional engagement with said column element; a spring follower engaging the rear end portions of said shoes, one of said shoes having wedging engagement with said spring follower only, and the remaining shoes having wedging engagement with said pressure transmitting member only; and spring resistance means yieldingly opposing movement of said spring follower inwardly of the column element.

5. In a friction shock absorbing mechanism, the combination with a friction element having longitudinally extending friction surfaces; of a friction clutch having lengthwise sliding engagement with said element, said clutch including an outer pressure transmitting member, an inner spring follower, a shoe movable inwardly in unison with said pressure transmitting member and having wedging engagement only with said spring follower, and additional shoes having wedging engagement with said pressure transmitting member only and bearing on said spring follower, all of said shoes having sliding frictional engagement with the friction surfaces of said element; and a spring resistance yieldingly opposing movement of said spring follower inwardly of said element.

6. In a friction shock absorbing mechanism, the combination with a friction element having lengthwise extending friction surfaces; of a plurality of friction shoes having sliding frictional engagement with said surfaces; a spring follower engaging the inner ends of said shoes; a pressure transmitting member adapted to receive the actuating force, said member having a flat, transverse abutment face engaging the outer end of one of said shoes to force the same inwardly along said element, said shoe having wedging engagement with said spring follower, said pressure transmitting element having wedging engagement with the remaining shoes, said remaining shoes bearing at their rear ends on said spring follower, the engagement of said last named shoes and spring follower being on flat, transverse faces; and a spring resistance yieldingly opposing movement of said spring follower inwardly lengthwise of said element.

7. In a friction shock absorbing mechanism, the combination with a friction casing having interior friction surfaces; of a friction clutch slidingly telescoped within the casing, said clutch including an outer pressure transmitting member, an inner spring follower, a shoe movable inwardly in unison with said pressure transmitting member and having wedging engagement with said spring follower only, a second shoe having wedging engagement with said pressure transmitting member only and bearing on said spring follower, said shoes having sliding frictional engagement with the friction surfaces of the casing; and a spring yieldingly opposing movement of said spring follower inwardly of the casing.

8. In a friction shock absorbing mechanism, the combination with a friction casing; of a friction clutch slidingly telescoped within said casing, said clutch including a plurality of friction shoes in sliding frictional engagement with the interior of the casing, and a pressure transmitting member adapted to receive the actuating force and engaging the forward end portions of said shoes; a spring follower engaging the rear end portions of said shoes, one of said shoes having keen wedging engagement with said spring follower only, and the remaining shoes having wedging engagement with said pressure transmitting member only, the wedging engagement between one of said remaining shoes and the pressure transmitting member being at a relatively blunt releasing angle; and spring resistance means yieldingly opposing movement of said spring follower inwardly of the casing.

9. In a friction shock absorbing mechanism, the combination with a friction casing having interior, inwardly converging friction surfaces; of a friction clutch slidingly telescoped within the casing, said clutch including an outer pressure transmitting member, an inner spring follower member, a shoe having wedging engagement with one of said members only, said wedging engagement being at a relatively keen wedging angle, a second shoe having wedging engagement with the other member only, said wedging engagement being at a relatively blunt releasing angle, all of said shoes having sliding frictional engagement with the friction surfaces of the casing; and a spring resistance within the casing yieldingly opposing movement of said spring follower member inwardly of the casing.

GEORGE E. DATH.

REFERENCES CITED

The following references are of record in the file of this patent:

UNITED STATES PATENTS

| Number | Name | Date |
|---|---|---|
| 1,510,335 | O'Connor | Sept. 30, 1924 |
| 1,616,756 | O'Connor | Feb. 8, 1927 |
| 2,072,274 | Olander | Mar. 2, 1937 |
| 2,273,192 | Haseltine | Feb. 17, 1942 |
| 2,281,270 | Cottrell | Apr. 28, 1942 |
| 2,333,249 | Haseltine | Nov. 2, 1943 |
| 2,335,847 | Dath | Dec. 7, 1943 |